United States Patent
McMurray et al.

(10) Patent No.: US 6,722,542 B2
(45) Date of Patent: Apr. 20, 2004

(54) SIDE ENTRY STORAGE NET

(75) Inventors: Brian L. McMurray, Pinehurst, NC (US); Robert Pickens, Bloomfield Hills, MI (US)

(73) Assignee: McMurray Fabrics, Inc., Aberdeen, NC (US)

( * ) Notice: Subject to any disclaimer, the term of this patent is extended or adjusted under 35 U.S.C. 154(b) by 70 days.

(21) Appl. No.: 09/931,615

(22) Filed: Aug. 16, 2001

(65) Prior Publication Data

US 2002/0043543 A1 Apr. 18, 2002

Related U.S. Application Data

(60) Provisional application No. 60/225,720, filed on Aug. 16, 2000.

(51) Int. Cl.$^7$ .................................................. B60R 5/00
(52) U.S. Cl. ..................... 224/563; 224/572; 383/66; 383/102; 383/117
(58) Field of Search ................................ 224/318, 320, 224/563, 543, 567, 403, 572, 275; 383/66, 117, 102

(56) References Cited

U.S. PATENT DOCUMENTS

| | | | | |
|---|---|---|---|---|
| 4,010,785 A | * | 3/1977 | Patik | 383/117 |
| 4,681,781 A | * | 7/1987 | Murray et al. | 383/109 |
| 5,012,963 A | | 5/1991 | Rosenbaum | |
| 5,040,711 A | | 8/1991 | Niederhauser et al. | |
| 5,238,307 A | * | 8/1993 | Mooney et al. | 383/107 |
| 5,339,657 A | | 8/1994 | McMurray | |
| 5,340,004 A | | 8/1994 | Moore | |
| 5,628,442 A | * | 5/1997 | Wayne | 224/543 |
| 5,730,530 A | * | 3/1998 | Stoddard et al. | 383/117 |
| 5,823,683 A | * | 10/1998 | Antonacci et al. | 383/117 |
| 6,030,160 A | | 2/2000 | Moore | |
| 6,080,093 A | * | 6/2000 | Henderson et al. | 493/187 |

FOREIGN PATENT DOCUMENTS

| GB | 2181345 A | 4/1987 |
|---|---|---|
| GB | 2196907 A | 5/1988 |

* cited by examiner

*Primary Examiner*—Nathan J. Newhouse
(74) *Attorney, Agent, or Firm*—Kilpatrick Stockton LLP

(57) ABSTRACT

A side entry storage net useful for securing items in a storage area comprises an upper and lower front panel, a back panel, and two sides formed from a piece of netting folded at upper and lower folds. Edges of the folds are spaced apart to form an opening to allow items to be placed inside the net from the side. The storage net further includes a plurality of elastic cords that allow the storage net to be opened and to hold stored items in place without shifting. The storage net also includes means for attaching the net to a desired external surface, such as a storage area in a motor vehicle.

32 Claims, 4 Drawing Sheets

SIDE ENTRY STORAGE NET

REFERENCE TO RELATED APPLICATIONS

This application claims priority to pending Provisional Patent Application Ser. No. 60/225,720, filed Aug. 16, 2000, which is hereby incorporated herein in full by reference.

FIELD OF THE INVENTION

The present invention generally relates to storage nets. Embodiments of the present invention provide a net and net system that are advantageous for use in storage areas, including trunks, rear compartments, rear lockers, beds, and the like, of motor vehicles and boats. Embodiments of the present invention are also useful in other environments where items are stored.

BACKGROUND OF THE INVENTION

Nets are well known for supporting or containing a load in a variety of applications. Because knitted netting is strong yet lightweight, there is widespread use of nets constructed of this type of netting. It is common to produce knitted netting by warp knitting on a Raschel-type knitting machine. A Raschel knitting machine is capable of knitting from an array of yarn ends threaded through a number of guide bars which shog, or move laterally, as the knitting needles of the machine move vertically. The several guide bars are individually controlled in a manner so as to create a particular stitch pattern. Knitted netting is created by a series of legs and alternating joins forming a net having uniform-sized diamond-shaped openings. A leg is a knit cord made of a number of warp yarn ends knit together for a specified number of courses. A join is a crossover connection between two adjacent legs.

One application of knitted netting is restraining movement of items stowed in storage compartments of motor vehicles, boats, and the like. Automotive storage nets have become particularly desirable, not only to prevent damage to the stowed item(s) but to prevent the stowed item from causing damage to other items which may be typically carried in a storage compartment, such as, by way of example, a compact disk player mounted in the trunk of a car. A typical automotive storage net consists of a piece of netting folded to form a front panel and a back panel. The sides of each panel may be closed, for example by sewing them to a nylon section that serves to close the sides.

Other embodiments of automotive storage nets include single panel nets, which, for example, are secured to seat backs or along the sides or floor of the trunk. These single panel nets may include one or more elastic members sewn into, or threaded into, the net along the perimeter of the panel. The elastic members help the net restrain items placed between the net and the seat back or side panel of the trunk by providing the net structure with elasticity. Such elasticity enables the net to surround an item and restrain the item against the seat back or side panel of the trunk.

Nets are also utilized in other automotive applications, including on sun visors, between seats, and on car tops to restrain and/or secure items or cargo.

In addition to automotive applications, nets are generally utilized in many other fields, including, but not limited to, marine applications, construction applications, warehouse applications, and cargo applications.

While conventional nets may prevent items from moving freely across a storage compartment, they may not hold all items securely in place. One disadvantage of conventional nets large enough to hold large items is that they are too large to properly secure smaller items. Such nets and netting designs have not previously held various size items in place equally well. Another disadvantage of such nets is that attempting to tighten the netting to sufficiently secure an item may damage the item. Yet another disadvantage of currently available nets is that threading an elastic member through the net, and/or sewing an elastic member into the net, increases the labor and expense required to produce the net.

Therefore, it would be advantageous to have a net, and netting, that includes integral elastic strands for sufficiently securing various sized items without damaging the items. There is also a need for an easy and inexpensive method of making such a net using currently available manufacturing equipment and techniques, such as on a Raschel knitting machine. Thus, there is a need for nets and netting that do not have, or that reduce, the disadvantages of conventional nets discussed above, and that provide other advantages.

It is to these perceived needs, and other objects, that the present invention is directed.

SUMMARY

The present invention provides a storage net that overcomes the disadvantages of current net designs and that may be advantageously utilized in a variety of applications. A feature of a storage net of the present invention is that a panel of the net includes an opening to allow items to be placed inside the net.

An embodiment of a storage net of the present invention comprises a substantially rectangular piece of netting, including opposing edges, that is folded to produce a back panel and upper and lower front panels and to define an opening in the front panels formed by the opposing edges of the net. A first, or lower, fold defines the bottom of the storage area and a second, or upper, fold defines the top of the storage area. The sides of the storage net may be open or closed. The sides may be closed by sewing the sides of the netting together, or by sewing the sides of the netting to a separate knit section of fabric, such as a sheath of nylon fabric.

A storage net may further include one or more elastic cords. Elastic cords can be utilized in one or more of the following locations: the bottom of the storage area; the top of the storage area; one or both side(s) of the storage net; and/or one or both opposing edge(s) at the opening of the net.

The elastic cords can be secured to the netting along the length and to the ends of the netting by threading, or interlacing, through web-like openings in the netting. The ends of the elastic cords can be attached to the sides of the net if the net is closed. In embodiments, ends of the elastic cords are also adapted to fasten the net to a storage area through the use of attachment means. For example, loops may be formed by folding the elastic cord back on itself and sewing, or bar tacking, the cord pieces together. The elastic cord is generally of sufficient length to allow the storage net to be opened while minimizing movement of the net when items are placed inside.

In embodiments, a storage net of the present invention further includes loops, hooks, eyelets, or the like, to allow the net to be removably, or permanently, attached to a storage area. As described above, loops may be formed utilizing elastic cord. For example, in an embodiment, a storage net includes loops to allow the net to be fastened to, and unfastened from, hooks in a storage area of a motor vehicle.

Netting useful in a storage net of the present invention comprises a plurality of cords positioned in side-by-side relationship and joins formed at intervals along the length of each cord. Such joins successively join the cords to each other along their length such that the cords and joins form a web structure.

A cord is a ply yarn that has been twisted together. (Fairchild's Dictionary of Textiles, 7th Edition, page 135.) A plurality of substantially inelastic yarns may be utilized to form the cords, which may comprise braided cords. The number and size of the cords and joins may vary depending on the ultimate application of the netting. An illustrative embodiment of a storage net and netting of the present invention is set forth in the following detailed description.

Netting of the present invention may be produced by warp knitting on a Raschel-type knitting machine in the manner generally described in commonly assigned U.S. Pat. No. 5,339,657, the disclosure of which is hereby incorporated by reference. As will be understood by those of ordinary skill in the art, a variety of netting types are suitable for use in the present invention depending on the desired application. As an example, netting may comprise woven and/or non-woven yarns or fabrics, which may be spaced apart to provide a web-like structure.

Features of a storage net of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

A storage net according to the present invention provides numerous advantages over currently available storage nets. For example, the present invention advantageously provides a storage net in which the storage area can be accessed from the side.

Another advantage of a storage net of the present invention is that items stored in the net will be restrained from coming out of the top of the net, thereby overcoming a disadvantage with storage nets that are open along the top.

A further advantage of a storage net of the present invention is that the tops of large items within the storage area of the net can be restrained to minimize their movement.

A storage net of the present invention can be utilized in a large number of applications. Such a storage net can be utilized in the trunk or storage area of an automobile to assist in restraining items carried in the trunk or storage area. A storage net of the present invention can also be utilized in the rear of a passenger or cargo van, sport utility vehicle, and/or in a truck bed, for example, the rear of a pick-up truck or similar vehicle, to securely hold items. Embodiments of a storage net of the present invention can also be utilized in marine applications, for example in boats or personal watercraft. A storage net of the present invention is also advantageous for use in storage areas in buildings, office areas, warehouses, and the like.

As will be realized by those of skill in the art, many different embodiments of a storage net according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

Figure 1:
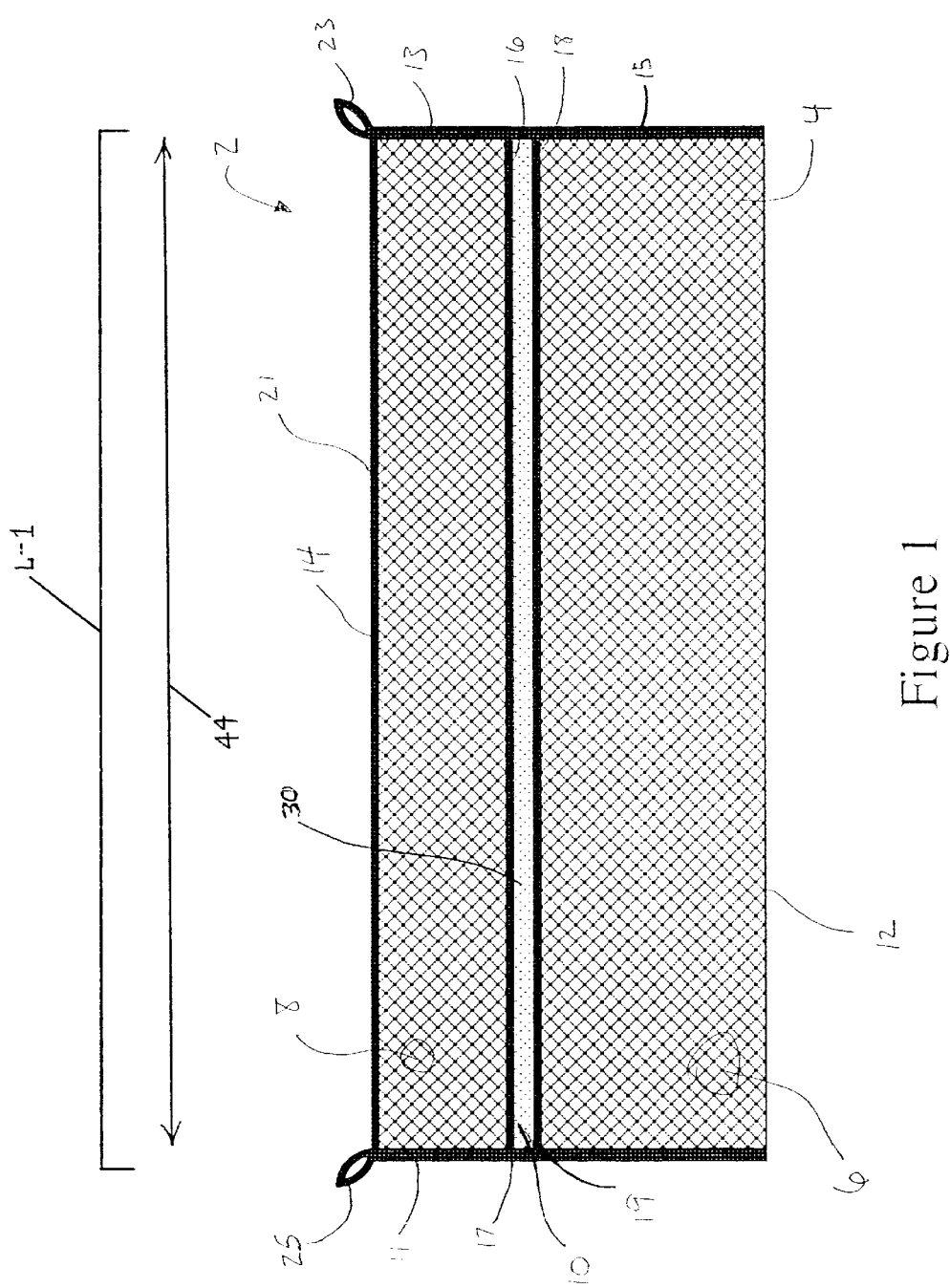
FIG. 1 is a front view of an embodiment of a storage net of the present invention.

FIGS. 1–5 show various aspects of embodiments of the present invention. One embodiment comprises a side entry storage net for use in a storage area of a motor vehicle. FIG. 1 illustrates one such embodiment of a storage net 2. The storage net comprises netting 4, formed from knit cords and knit joins. The substantially rectangular netting 4 is folded to form lower front panel 6 and upper front panel 8, and a back panel 10, viewable through the opening between the upper and lower front panels. Folding netting 4 in this manner forms lower fold 12 and upper fold 14 of the storage net. Lower front panel 6 extends from lower fold 12 to lower edge 18. Upper panel 8 extends from upper fold 14 to upper edge 16. Upper edge 16 and lower edge 18 and are positioned in opposition to each other. The area between opposed netting edges 16 and 18 forms net opening 30.

Figure 2:
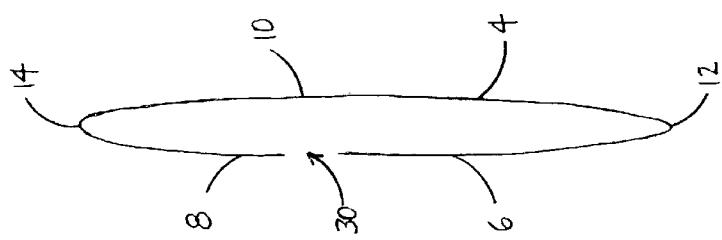
FIG. 2 is a side view of an embodiment of a storage net of the present invention.

FIG. 2 depicts in side view an embodiment of netting 4 folded at lower edge 12 to produce lower front panel 6 and folded at upper edge 14 to produce upper front panel 8. Back panel 10 is viewable through net opening 30.

Figure 3:
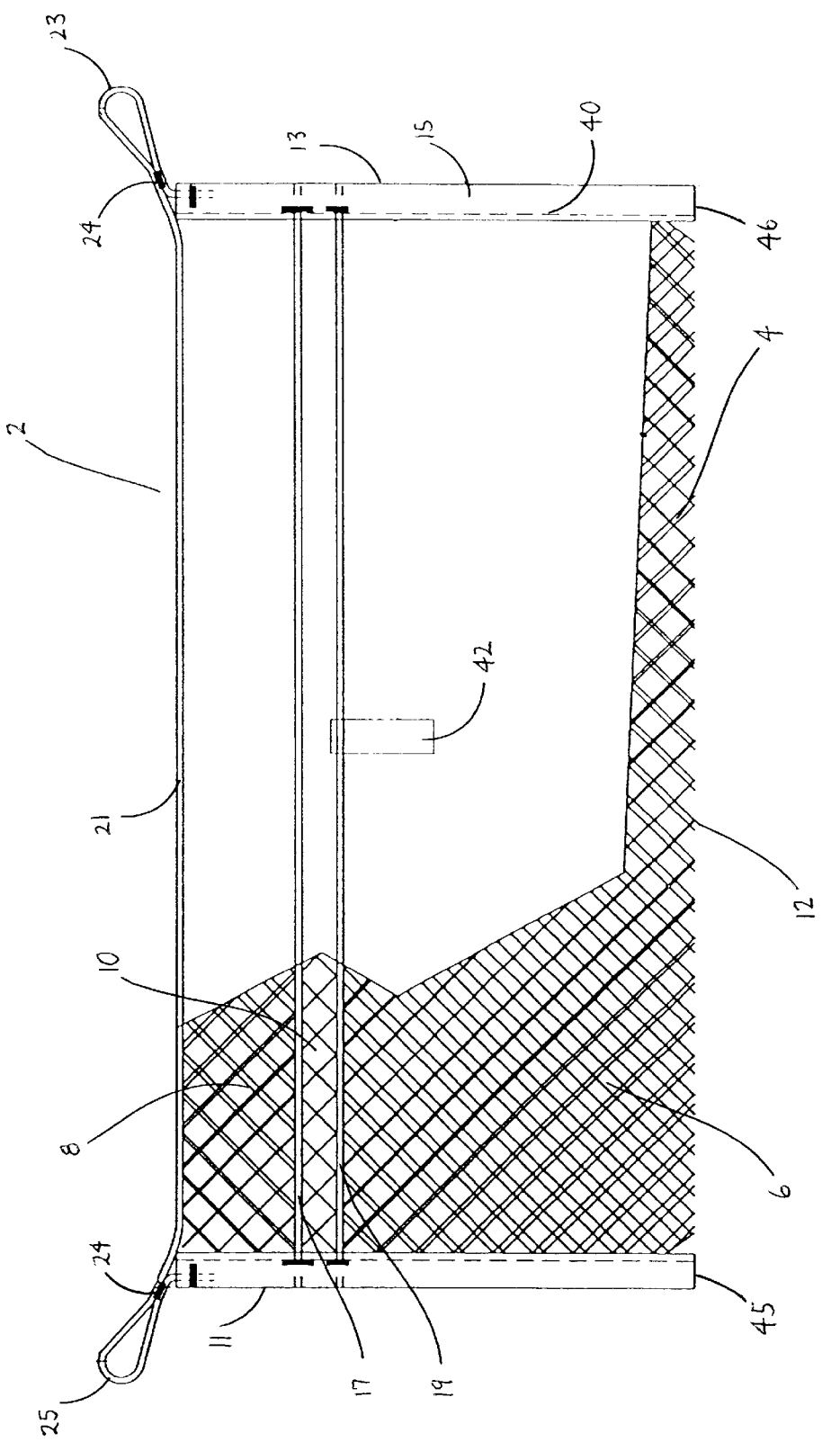
FIG. 3 is a front view engineering drawing of an embodiment of a storage net of the present invention.

As shown in FIGS. 1 and 3, storage net 2 includes ends 11 and 13. Folding the netting along lengthwise axis 44 to form front and back panels aligns the ends of lower front panel 6 and upper front panel 8 with the ends of back panel 10 at each of the ends 11 and 13 of netting 4. As such, each end of the storage net can be closed together. For example, as shown in FIG. 3, the ends 11 and 13 of net 2 are closed by sewing the ends of netting 4 together, for example along sew line 40, to form sewn ends. The ends of netting 4 can be sewn to a separate piece of material, such as nylon fabric 15. In embodiments, ends sewn to a separate piece of material comprise a sheath 45, 46, formed by folding the separate material around the ends of netting 4 to leave a space inside the folded material as an end and material is sewn together along sew line 40.

Figure 4:
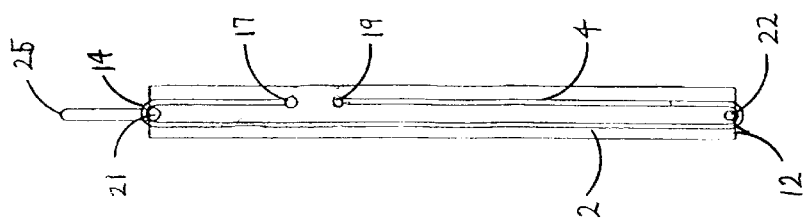
FIG. 4 is a side view engineering drawing showing location of elastic cords in an embodiment of a storage net of the present invention.

A storage net of the present invention preferably includes at least one elastic cord secured to the netting. In embodiments, netting 4 comprises a web structure, and elastic cords can be secured to the netting by threading the cords through the web structure. FIG. 4 is a side view of an embodiment of the present invention, showing locations of elastic cords. As shown in FIGS. 1 and 4, elastic cords 17 and 19 are threaded through netting 4 near edges 16 and 18, respectively, along lengthwise axis 44, and fastened to end pieces 11 and 13. Elastic cords 17 and 19 provide elasticity to net 2 at net opening 30. Elastic cords 17 and 19 are preferably of sufficient length and elasticity to allow storage net 2 to be opened to place items inside the net.

In addition, elastic cord 21 is threaded through upper edge 14 of the storage net and fastened to end pieces 11 and 13. Elastic cord 21 provides additional elasticity to the storage net. In other embodiments, elastic cord 22, as shown in FIG. 4, is threaded through lower edge 12 of the storage net. Elastic cord 22 can also be fastened to end pieces 11 and 13, and provides additional elasticity to the storage net.

In embodiments, elastic cords can be threaded through sheaths 45 and 46 at ends 11 and 13, respectively. Use of elastic cords at the ends of net 2 provides further ability to shape the net to a particular storage area and enhances the net's ability to secure items inside. As shown in FIG. 3, for example, in addition to elastic cord 21 being threaded through upper edge 14 of the net, the ends of elastic cord 21 are threaded through sheaths 45 and 46.

As seen in FIGS. 1 and 4, lower fold 12 defines the bottom of the storage area inside net 2, and upper fold 14 defines the top of the storage area inside net 2. As such, embodiments of the present invention provide a storage net having a top such that items stored in the net are restrained from coming out of the top of the net. In addition, tops of large items stored within the storage area of the net are restrained to minimize their movement, such as during transport in a motor vehicle.

In embodiments, a storage net of the present invention further comprises a means for removably attaching the net to a storage area, for example, to the storage area of a motor vehicle. One such means for removably attaching a net to a storage area includes ends of one or more elastic cords adapted for attachment. Ends of elastic cords adapted for attachment comprise loops, hooks, eyelets, and other attachment devices.

For example, as shown in FIG. 1, loops 23 and 25 are formed in cord 21 by folding the cord over on itself and sewing the juxtaposed cord pieces together to form the loops. Alternatively, loops 23 and 25 may be formed by folding the cord over onto itself and bar tacking (24) the juxtaposed cord pieces together, as shown in FIG. 3. As discussed above, loops 23 and 25 can be utilized to fasten storage net 2 in place in a storage area of a motor vehicle.

As shown in FIG. 1, the length L-1 of storage net 2 extends from the outer edge of end 11 to the outer edge of end 13 along lengthwise axis 44 of net 2. Length L-1 may be varied depending on the desired end use of the net. In general, length L-1 will be approximately the same as the length of the opening of the storage area where the net is to be mounted or used. In embodiments of the net utilizing elastic cord(s), L-1 may be slightly less than the distance between surfaces of a storage area to which the net is mounted. For example, length L-1 of an elastic cord may be 10–100 cm, preferably 10–50 cm, less than the distance between mounting surfaces in the storage area so that tension is created in the elastic when the net is mounted.

Figure 5:
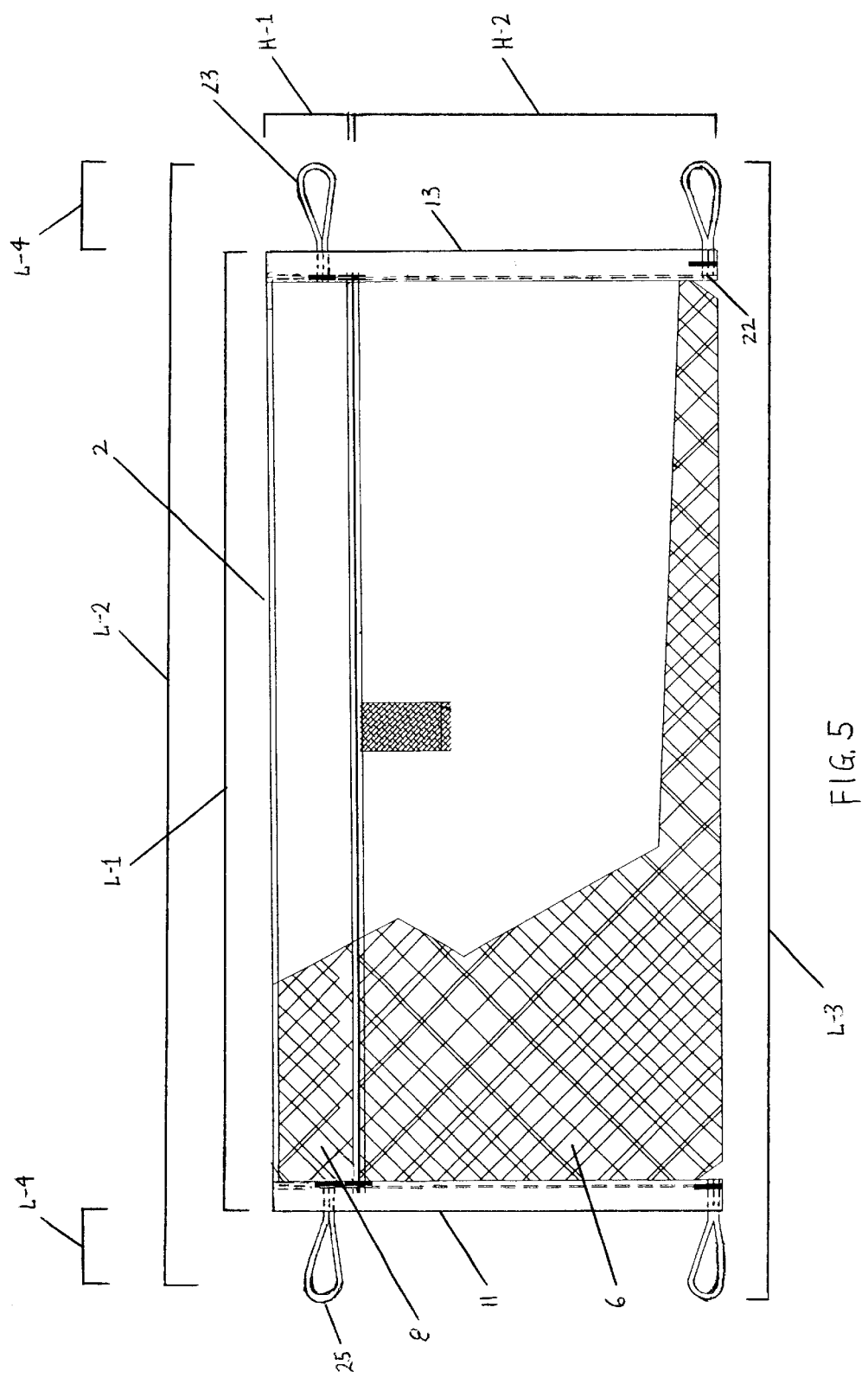
FIG. 5 is a front view engineering drawing showing dimensions in an embodiment of a storage net of the present invention.

Moreover, length L-1 of storage net 2 may be slightly less than the length L-2 of elastic cord(s), as shown in FIG. 5. Length L-2 of an elastic cord is approximately equal to length L-1 of storage net 2, length L-4 of loop 23, and length L-4 of loop 25. As an example, length L-2 of the elastic cord threaded through upper front panel 8 is in the range of 1215–1275 mm, length L-1 of net 2 is in the range of 1065–1085 mm, and length L-4 of loops 23 and 25 is each in the range of 75–95 mm. Preferably, length L-2 of the elastic cord threaded through upper front panel 8 is 1245 mm, length L-1 of net 2 is 1075 mm, and length L-4 of loops 23 and 25 is each 85 mm. Accordingly, length L-1 of storage net 2 may be 160–180 mm, preferably 170 mm, less than length L-2 of the elastic cord threaded through upper front panel 8.

In other embodiments, elastic cords at different locations in a storage net may vary in length depending on the shape and dimensions of the storage area to which the net is mounted. In the embodiment shown in FIG. 5, length L-3 of elastic cord 22 is longer than length L-2 of the elastic cord threaded through upper front panel 8. As an example of a storage net for an automobile trunk, length L-2 of the elastic cord threaded through upper front panel 8 is 1181 mm, and length L-3 of elastic cord 22 is 1219 mm, to accommodate a slightly greater distance between mounting surfaces at the bottom of the storage area.

Height dimensions of back panel 10, lower front panel 6, and upper front panel 8 also may vary depending on the desired end use of a net. For example, as shown in FIG. 5, in an embodiment for use in an automobile trunk, height H-1 of upper front panel 8 is in the range from 75 to 95 mm, and is preferably 85 mm. Height H-2 of lower front panel 6 is in the range from 200 to 240 mm, and is preferably 220 mm. In another embodiment of a storage net for an automobile trunk, height H-1 of upper front panel 8 is in the range from 70 to 90 mm, preferably 80 mm, and height H-2 of lower front panel 6 is in the range from 260–310 mm, and is preferably 285 mm.

For passenger car trunk applications, net lengths L-1, elastic cord lengths L-2, loop lengths L-4, upper front panel height H-1, and lower front panel height H-2 will generally fall in ranges similar to those illustrated above. For pick-up truck bed applications, net lengths L-1, elastic cord lengths L-2, loop lengths L-4, upper front panel height H-1, and lower front panel height H-2 will have generally similar proportional dimensions depending on the model of the truck.

In an embodiment, as shown in FIG. 3, strap 42 is attached to lower front panel 6 for pulling elastic cord 19 and lower front panel 6 open to facilitate placing items in storage net 2.

When netting 4 is formed from knit cords and knit joins, the netting comprises a plurality of cords in side-by-side relationship and joins formed at intervals between side-by-side cords such that the cords and joins form a web structure. In embodiments, the plurality of cords comprise substantially inelastic cords, which may be braided or formed by other conventional textile manufacturing techniques. For example, netting 4 may be produced by warp knitting on a Raschel-type knitting machine.

While the embodiments shown in FIGS. 1 and 3 are substantially rectangular, storage nets of the present invention comprise nets of a plurality of shapes and dimensions, depending on the end use of the net. For example, a storage net can be octagonal in shape to accommodate items of that shape or arranged in an octagonal configuration. As another example, a net can be square-shaped for uses and storage areas for which a square-shaped net would be useful.

In operation, for example for use in a trunk area of an automobile, or in the rear of a van or sports utility vehicle, storage net 2 is attached, via loops 23 and 25 to a storage area so that the net is disposed in a substantially perpendicular position relative to the floor of the trunk. Storage net 2 is positioned such that opening 30 of the net faces rearward. Strap 42 is pulled to extend elastic cord 19 and open lower front panel 6. Items may be placed in the net through opening 30 and are thereby restrained from moving about the trunk area during operation of a motor vehicle. A storage net of the present invention may also be utilized in a similar fashion in other applications discussed above.

Although the present invention has been described with reference to particular embodiments, it should be recognized that these embodiments are merely illustrative of the principles of the present invention. Those of ordinary skill in the art will appreciate that a storage net of the present invention may be constructed and implemented in other ways and embodiments. Accordingly, the description herein should not be read as limiting the present invention, as other embodiments also fall within the scope of the present invention.

What is claimed is:

1. A storage net, comprising:
   a piece of foldable netting having two ends and substantially parallel upper and lower edges along an axis between the two ends, the netting folded upon itself to form an upper fold and a lower fold parallel to the axis, the folded upon itself netting forming a back panel between the upper and lower folds, an upper front panel, and a lower front panel, wherein the upper and lower edges are folded in spaced apart opposition to each other to define an opening between the upper and lower front panels to allow items to be placed inside the storage net, wherein the ends of the upper front panel and lower front panel are joined to the ends of the back panel to form closed ends.

2. The storage net of claim 1, further comprising a means for removably attaching the net to a storage area.

3. The storage net of claim 1, wherein the piece of foldable netting is substantially rectangular.

4. The storage net of claim 1, wherein the storage net further comprises a strap connected to the lower front panel near the lower edge for pulling the net open.

5. The storage net of claim 1, wherein the closed ends further comprise sewn ends.

6. The storage net of claim 5, wherein the sewn ends are formed by sewing the ends of the netting together.

7. The storage net of claim 5, wherein the sewn ends comprise a sheath of separate material sewn to the ends of the netting.

8. The storage net of claim 7, wherein the sheath of separate material comprises nylon fabric.

9. The storage net of claim 1, wherein the netting further comprises a plurality of cords in side-by-side relationship and joins formed at intervals between side-by-side cords such that the cords and joins form a web structure.

10. The storage net of claim 9, wherein the plurality of cords further comprise substantially inelastic cords.

11. The storage net of claim 9, wherein the plurality of cords further comprise braided cords.

12. The storage net of claim 9, wherein the netting is produced by warp knitting on a Raschel-type knitting machine.

13. The storage net of claim 1, wherein the net further comprises at least one elastic cord having a first end and a second end, the at least one elastic cord secured to the netting along the axis and the first cord end secured to one end of the netting and the second cord end secured to the other end of the netting.

14. The storage net of claim 13, wherein the at least one elastic cord comprises at least three elastic cords and one elastic cord is secured along each end of the netting.

15. The storage net of claim 13, wherein the netting further comprises a web structure and the at least one elastic cord is secured along the axis of the netting by threading the cord through the web structure.

16. The storage net of claim 13, wherein the ends of the at least one elastic cord are adapted to removably attach the net to a storage area.

17. The storage net of claim 16, wherein the ends of the at least one elastic cord further comprise loops.

18. The storage net of claim 17, wherein the loops are formed by folding the at least one elastic cord back on itself and sewing the cord together.

19. The storage net of claim 17, wherein the loops are formed by folding the at least one elastic cord back on itself and bar tacking the cord together.

20. The storage net of claim 16, wherein the ends of the at least one elastic cord further comprise hooks.

21. The storage net of claim 16, wherein the ends of the at least one elastic cord further comprise eyelets.

22. The storage net of claim 16, wherein the ends of the at least one elastic cord further comprise a means for removably attaching the net to a storage area of a motor vehicle.

23. The storage net of claim 13, wherein one of the at least one elastic cord is secured at the upper fold of the netting.

24. The storage net of claim 23, wherein the at least one elastic cord comprises at least two elastic cords and another of the at least two elastic cords is secured at the lower fold of the netting.

25. The storage net of claim 24, wherein the at least one elastic cord comprises at least four elastic cords and one of the elastic cords is secured along each of the upper and lower edges.

26. The storage net of claim 25, wherein the at least one elastic cord comprises at least six elastic cords and one elastic cord is secured along each end of the netting.

27. The storage net of claim 25, wherein the one of the elastic cords secured along each of the upper and lower edges is of sufficient length and elasticity to allow the storage net to be opened to place items inside the net.

28. A storage net, comprising:
   a piece of foldable netting having two ends and substantially parallel upper and lower edges along an axis between the two ends, the netting folded upon itself to form an upper fold and a lower fold parallel to the axis, the folded upon itself netting forming a back panel between the upper and lower folds, an upper front panel, and a lower front panel,
   wherein the upper and lower edges are folded in spaced apart opposition to each other to define an opening between the upper and lower front panels to allow items to be placed inside the storage net,
   wherein the ends of the upper front panel and lower front panel are joined to the ends of the back panel to form closed ends,
   wherein the net further comprises at least one elastic cord having a first end and a second end, the at least one elastic cord secured to the netting along the axis and the first cord end secured to one end of the netting and the second cord end secured to the other end of the netting, and
   wherein the ends of the at least one elastic cord are adapted to removably attach the net to a storage area.

29. The storage net of claim 28, wherein the closed ends further comprise a sheath of nylon fabric sewn to the ends of the netting.

30. The storage net of claim 28, wherein the ends of the at least one elastic cord comprise loops to removably attach the net to a storage area, the loops formed by folding the at least one elastic cord back on itself and sewing the cord together.

31. The storage net of claim 28, wherein the netting further comprises a plurality of substantially inelastic cords in side-by-side relationship and joins formed at intervals between side-by-side cords such that the cords and joins forming a web structure.

32. A storage net, comprising:
   a piece of foldable, substantially rectangular netting having two ends and substantially parallel upper and lower edges along an axis between the two ends, the netting folded upon itself to form an upper fold and a lower fold parallel to the axis, the folded upon itself netting forming a back panel between the upper and lower folds, an upper front panel, and a lower front panel, wherein the upper and lower edges are folded in spaced apart opposition to each other to define an opening between the upper and lower front panels to allow items to be placed inside the storage net, wherein the ends of the upper front panel and lower front panel are joined to the ends of the back panel to form closed ends, wherein the net further comprises a plurality of elastic cords, each cord having a first end and a second end, each cord is secured to the netting along the axis and the first cord end is secured to one end of the netting and the second cord end is secured to the other end of the netting, wherein one of the plurality of elastic cords is secured at the upper fold of the netting, another one of the elastic cords is secured at the lower fold of the netting, one of the elastic cords is secured along each of the upper and lower edges, wherein the netting further comprises a plurality of substantially inelastic cords in side-by-side relationship and joins formed at intervals between side-by-side cords such that the cords and joins forming a web structure, wherein each of the plurality of elastic cords is secured along the axis of the netting by threading the cord through the web structure, wherein the storage net further comprises a strap connected to the lower front panel near the lower edge for pulling the net open, and wherein the ends of the at least one elastic cord further comprise loops to removably attach the net to a storage area.

* * * * *